US008725805B2

(12) United States Patent
Rubio Andres et al.

(10) Patent No.: US 8,725,805 B2
(45) Date of Patent: May 13, 2014

(54) SOCIALIZING WEB SERVICES

(75) Inventors: Francisco Javier Rubio Andres, Madrid (ES); Daniel Almodovar Herraiz, Madrid (ES); Guillermo Esteve Asensio, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 84 days.

(21) Appl. No.: 12/689,994

(22) Filed: Jan. 19, 2010

(65) Prior Publication Data
US 2010/0217802 A1    Aug. 26, 2010

(30) Foreign Application Priority Data

Jan. 19, 2009    (ES) .................................. 200900135

(51) Int. Cl.
| | |
|---|---|
| H04M 3/42 | (2006.01) |
| H04W 4/00 | (2009.01) |
| H04W 24/00 | (2009.01) |
| G06F 17/00 | (2006.01) |
| G06F 19/00 | (2011.01) |
| G06F 15/16 | (2006.01) |
| G06F 15/173 | (2006.01) |
| G06F 17/30 | (2006.01) |
| G06F 7/04 | (2006.01) |

(52) U.S. Cl.
USPC ...................... 709/204; 455/414.1; 455/414.2; 455/422.1; 455/456.1; 455/456.3; 463/16; 463/25; 463/31; 463/40; 463/42; 709/203; 709/219; 709/224; 709/226; 709/228; 726/4; 726/26

(58) Field of Classification Search
None
See application file for complete search history.

(56) References Cited

U.S. PATENT DOCUMENTS

| | | | |
|---|---|---|---|
| 7,240,022 B1 * | 7/2007 | Bistriceanu et al. ....... | 705/14.19 |
| 7,418,268 B1 | 8/2008 | Cabano et al. | |
| 2003/0154242 A1 * | 8/2003 | Hayes et al. .................. | 709/203 |
| 2003/0190590 A1 * | 10/2003 | Lumsden et al. ............. | 434/118 |
| 2004/0067773 A1 * | 4/2004 | Rachabathuni et al. ...... | 455/560 |
| 2005/0038876 A1 | 2/2005 | Chaudhuri | |
| 2005/0222905 A1 * | 10/2005 | Wills .............................. | 705/14 |
| 2006/0010240 A1 * | 1/2006 | Chuah .......................... | 709/228 |
| 2006/0069749 A1 * | 3/2006 | Herz et al. .................... | 709/219 |
| 2007/0011155 A1 * | 1/2007 | Sarkar ............................. | 707/5 |
| 2007/0069890 A1 * | 3/2007 | Tuck ........................ | 340/539.13 |
| 2007/0069901 A1 * | 3/2007 | Tuck et al. ................. | 340/573.1 |
| 2007/0112762 A1 * | 5/2007 | Brubaker .......................... | 707/5 |
| 2007/0173321 A1 * | 7/2007 | Shen et al. ..................... | 463/40 |
| 2007/0173327 A1 * | 7/2007 | Kilgore et al. .................. | 463/42 |
| 2007/0174389 A1 * | 7/2007 | Armstrong et al. ........... | 709/204 |
| 2007/0192333 A1 * | 8/2007 | Ali ................................. | 707/10 |
| 2008/0077517 A1 * | 3/2008 | Sappington ..................... | 705/35 |
| 2008/0091684 A1 * | 4/2008 | Ellis et al. ...................... | 707/10 |
| 2008/0109291 A1 * | 5/2008 | Montes de Oca ................ | 705/9 |
| 2008/0113809 A1 * | 5/2008 | David et al. .................... | 463/42 |
| 2008/0139181 A1 * | 6/2008 | Lokshin .................... | 455/414.1 |

(Continued)

*Primary Examiner* — Ario Etienne
*Assistant Examiner* — Ho Shiu
(74) *Attorney, Agent, or Firm* — Workman Nydegger

(57) ABSTRACT

A Method for sharing and recording achievements obtained in web services, comprising:
- receiving, at an achievements information server, from at least one web service the achievements obtained by different Internet users in the corresponding web service;
- storing at the achievements information server said achievements associated with each Internet user;
- downloading the stored achievements of each Internet user to a mobile device of a corresponding Internet user, (i.e. a broadcast user);
- the broadcast user selecting at least one achievement, among the downloaded achievements, to broadcast;
- broadcasting from the mobile device of the broadcast user said at least one selected achievement.

23 Claims, 1 Drawing Sheet

(56) References Cited

U.S. PATENT DOCUMENTS

| | | | |
|---|---|---|---|
| 2008/0182724 A1* | 7/2008 | Guthrie | 482/8 |
| 2008/0207183 A1* | 8/2008 | Root et al. | 455/414.2 |
| 2008/0207329 A1* | 8/2008 | Wallace et al. | 463/42 |
| 2008/0228775 A1* | 9/2008 | Abhyanker et al. | 707/10 |
| 2008/0242277 A1* | 10/2008 | Chen et al. | 455/414.2 |
| 2008/0270151 A1* | 10/2008 | Mahoney et al. | 705/1 |
| 2008/0270579 A1* | 10/2008 | Herz et al. | 709/219 |
| 2008/0291022 A1* | 11/2008 | Amador et al. | 340/572.1 |
| 2008/0294655 A1* | 11/2008 | Picault et al. | 707/100 |
| 2009/0012988 A1* | 1/2009 | Brown | 707/102 |
| 2009/0017798 A1 | 1/2009 | Pop | |
| 2009/0019003 A1* | 1/2009 | Bohannon et al. | 707/3 |
| 2009/0043655 A1* | 2/2009 | Westbrook, Jr. | 705/14 |
| 2009/0047972 A1* | 2/2009 | Neeraj | 455/456.1 |
| 2009/0070412 A1* | 3/2009 | D'Angelo et al. | 709/203 |
| 2009/0077057 A1* | 3/2009 | Ducheneaut et al. | 707/5 |
| 2009/0111581 A1* | 4/2009 | Ostergren et al. | 463/42 |
| 2009/0144639 A1* | 6/2009 | Nims et al. | 715/757 |
| 2009/0171939 A1* | 7/2009 | Athsani et al. | 707/5 |
| 2009/0282144 A1* | 11/2009 | Sherrets et al. | 709/224 |
| 2009/0287774 A1* | 11/2009 | Punera et al. | 709/204 |
| 2009/0319663 A1* | 12/2009 | Giles et al. | 709/226 |
| 2009/0328158 A1* | 12/2009 | Ollila et al. | 726/4 |
| 2010/0023506 A1* | 1/2010 | Sahni et al. | 707/5 |
| 2010/0031366 A1* | 2/2010 | Knight et al. | 726/26 |
| 2010/0049852 A1* | 2/2010 | Whitnah et al. | 709/226 |
| 2010/0056183 A1* | 3/2010 | Oh | 455/456.3 |
| 2010/0057743 A1* | 3/2010 | Pierce | 707/10 |
| 2010/0063863 A1* | 3/2010 | Begeja et al. | 705/10 |
| 2010/0069058 A1* | 3/2010 | Rothschild | 455/422.1 |
| 2010/0130286 A1* | 5/2010 | Ackley et al. | 463/42 |
| 2010/0137049 A1* | 6/2010 | Epstein | 463/7 |
| 2010/0141433 A1* | 6/2010 | Tuck | 340/539.13 |
| 2010/0153521 A1* | 6/2010 | Lor et al. | 709/219 |
| 2010/0216536 A1* | 8/2010 | Gagner et al. | 463/16 |
| 2010/0223261 A1* | 9/2010 | Sarkar | 707/726 |
| 2011/0098156 A1* | 4/2011 | Ng et al. | 482/8 |
| 2011/0207525 A1* | 8/2011 | Allen et al. | 463/25 |
| 2011/0269540 A1* | 11/2011 | Gillo et al. | 463/31 |
| 2011/0271328 A1* | 11/2011 | Sutton-Shearer | 726/4 |
| 2011/0300926 A1* | 12/2011 | Englman et al. | 463/25 |

* cited by examiner

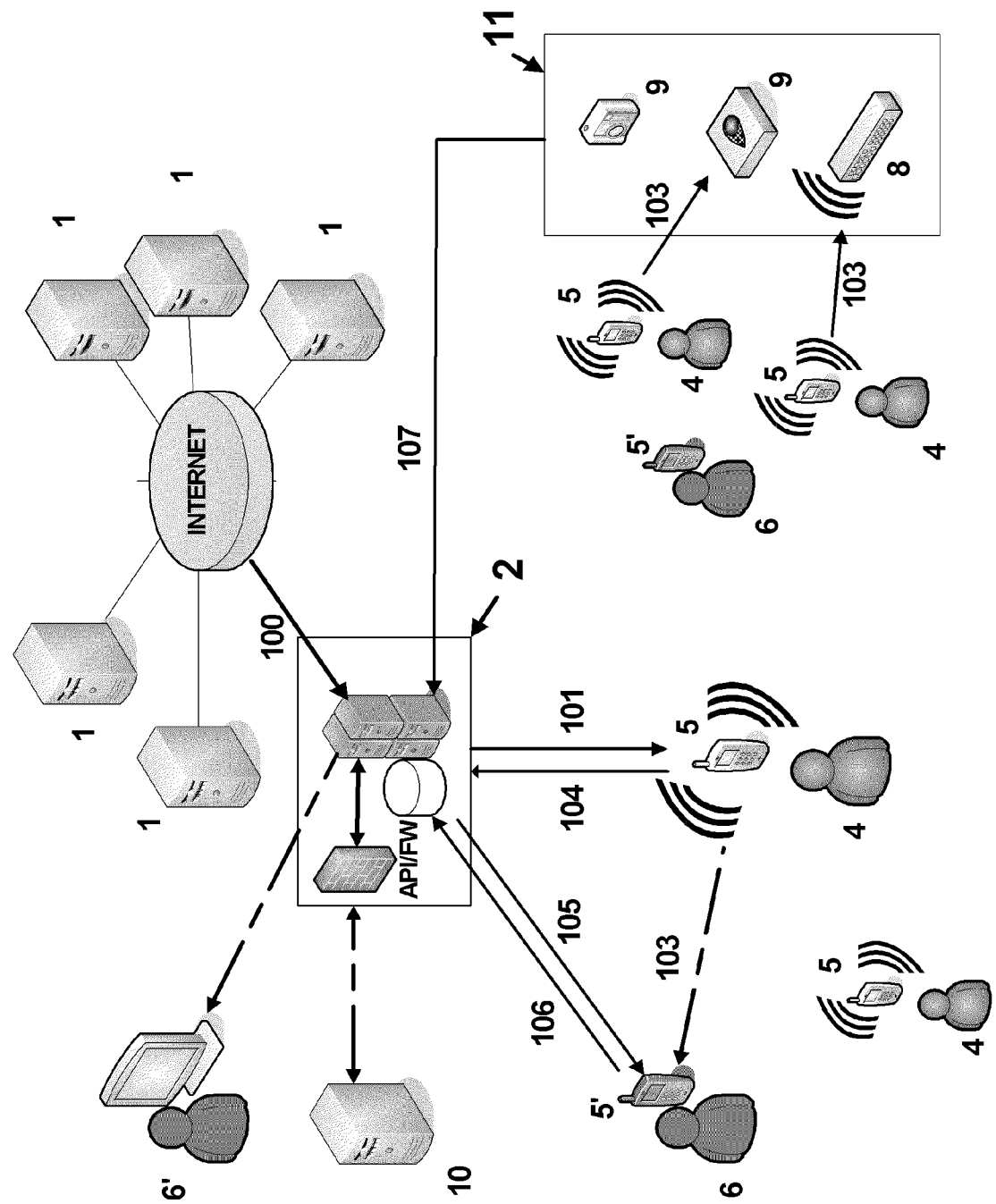

SOCIALIZING WEB SERVICES

CROSS-REFERENCES AND RELATED APPLICATIONS

This application claims the benefit of Spanish Patent Application No. ES 200900135, filed Jan. 19, 2009, entitled "Socializing Web Services," which is incorporated herein by reference in its entirety.

RELEVANT FIELD

Embodiments of the present invention relate to the field of internet communities and more specifically to interactions within and between such communities. In particular, the invention relates to the sharing of Internet achievements in internet communities.

BACKGROUND

There is a problem when someone tries to find other people with similar tastes. The problem is that people move in time and space. A success for a service is providing user needs just in time when it is required. For that reason a spatial and time distribution of the people's tastes is important.

On the other hand, there are many internet communities that could be used to understand user preferences better: some of these communities like "funky, sexy, cool" tag users results (www-funkysexycool-com) and this information can be seen by users as achievements or, more generally speaking, a profile. There is presently no way to share these achievements and profiles with users (except Internet itself).

Nowadays, groups of interest and "urban tribes" know places and hours to find people with their same interest or tastes by written or oral communication (i.e. stamp collectors meet on Saturday morning on Plaza Mayor, electronic music fans meet in the discotheque's parking area in the evenings, etc). This behavior is facilitated by Internet forums, reviews or recommendations issued by certain individuals (either in media or Internet) that may deliver a "profile" of the place.

Well connected people from some internet communities may launch meetings and events but all these attempts are very limited.

The present invention solves the above commented problems by using the user's mobile device (phone, PDA, etc.) and a system for broadcasting Internet achievements, that is, achievements obtained in the Internet community, such as social networks, online games, forum, etc. Some achievements can be cited as examples:

60% cool (in the "funky, sexy, cool" web site)
80% hot (in the "hot or not" web site)
340 friends in Facebook.
Honor points in WoW ("World of Warcraft")
"Renowned Hero" title in "GuildWars" (an online game).

To obtain these achievements users of all ages spend some of their leisure time, and they are proud to show off their achievements. Embodiments of the present invention can be used to publish the achievements and obtain information of the achievements of other users, facilitating the meetings among different Internet communities at any time and in any city of the world.

It is well-known that abbreviations and acronyms are frequently used in the mobile telephony field. Below is a glossary of acronyms/terms used throughout the present specification:
API Application Programming Interface
IEEE Institute of Electrical and Electronics Engineers

SUMMARY OF EXAMPLE EMBODIMENTS

Embodiments of the invention relate to methods and systems for sharing and recording achievements obtained in web services.

For example, a method comprises the following steps:
receiving an achievements information server from at least one web service the achievements obtained by different Internet users in the corresponding web service;
storing on the achievements information server said achievements associated with each Internet user;
downloading the stored achievements of each Internet user to a mobile device of the corresponding Internet user, the broadcast user;
selecting from the broadcast user at least one achievement, among the downloaded achievements, to broadcast;
broadcasting from the mobile device of the broadcast user said at least one selected achievement.

The broadcasting of the at least one selected achievement may be performed in at least one of the following ways:
using short range technology to communicate with other electronic devices;
using the cellular network or a WiFi connection to communicate with the achievements information server.

The method may further comprise:
receiving at the achievements information server the at least one broadcasted achievement corresponding to different broadcast users, along with their corresponding localization;
sending, by the achievements information server, as a response to a request, information related to the localization of broadcast users with at least one achievement fulfilling determined conditions established on the request;

The method may also comprise:
capturing in a broadcasting device installed in a specific area all the achievements received from broadcast users;
broadcasting said achievements captured.

The method may additionally comprise broadcasting, together with the achievements captured by the broadcasting device, data on the measures of at least one sensor device installed in the area.

The broadcasting of said achievements captured by the broadcasting device may be performed in one of the following ways:
using short range technology to communicate with other electronic devices;
using the cellular network or a DSL connection to communicate with the achievements information server.

In another example, there is provided a system for sharing and recording achievements obtained in web services. The exemplary system comprises:
an achievements information server, comprising:
means for receiving from at least one web service the achievements obtained by different Internet users in the corresponding web service;
means for storing said achievements associated with each Internet user;
a mobile device of each Internet user, configured for:
downloading from the achievements information server the achievements of the corresponding Internet user, the broadcast user;
selecting at least one achievement, from among the downloaded achievements, to broadcast;
broadcasting said at least one selected achievement.

The achievements information server is preferably further configured for:

receiving at the achievements information server the at least one broadcasted achievement corresponding to different broadcast users, along with their corresponding localization;

sending, by the achievements information server, as a response to a request, information related to the localization of broadcast users with at least one achievement fulfilling determined conditions established on the request;

The system may further comprise a broadcasting device installed in each specific area configured for capturing and broadcasting all the achievements received from broadcast users. The broadcasting device can be further configured for broadcasting, together with the achievements captured by the broadcasting device, data on the measures of at least one sensor device installed in the area. The broadcasting of said achievements captured by the broadcasting device can be performed in at least one of the following ways:

using short range technology to communicate with other electronic devices;

using the cellular network or a DSL connection to communicate with the achievements information server.

BRIEF DESCRIPTION OF THE DRAWINGS

A series of drawings which aid in better understanding the invention and which are expressly related with an embodiment of said invention, presented as a non-limiting example thereof, are very briefly described below.

FIG. 1 shows a preferred embodiment of the invention.

DETAILED DESCRIPTION OF EXAMPLE EMBODIMENTS

Example embodiments are directed to the notion of people using a mobile terminal (i.e. a cellular telephone) as a beacon that shows to the rest of the world their community profile or achievements including their location (usually a mobile widget with GPS or bluetooth characteristics) and a method to publish this information in a centralized database. This can be applied to individuals and also to places (bars, sightseeing areas, etc). The implementation can be in two ways:

a) Using the cellular network to make available the localization of the profile in Internet.

b) Using local sensors in some places (bars, discotheques, etc) to obtain a more focalized info of the profile in the area and include more real time information like number of people, environment details, etc.

The information profile and the place or the person would be delivered remotely but it is not necessary to identify this information with a specific place or person. The idea is to use the average profile of the people and places in an area at a specific time and the distribution of this data to provide information and services.

Some examples could be: the centralized database will provide maps of a city like Madrid where one could find the distribution hours and places of people with a profile higher than 50% sexy in "Funky, Sexy, Cool" community (www-funkysexycool-com) or areas of "Tuenti" users (Spanish community for young people in Internet) in London city. Users and third parties could take advantage of this information to find people with the same preferences or launch innovative vertical services. It must be taken into account that it is very frequent that the same place hosts very different communities, music and style in different days of the week or at different opening hours.

The user would decide what achievements and communities want to distribute, but using sensors this information service can be improved: for example a bar with sensor devices and local broadcasting methods to measure and provide for instance the percentages of people with a specific profile, the occupancy and environment measures (such as temperature or noise level) to attract potential users outside and promote the bar.

The beacon process will be carried out via the mobile phone: in essence software connects to the relevant internet community API, captures the present value of achievement (sexy or not, number of friends in Facebook, etc.) and sends it to the central database or communicates with a short range node to deliver this information.

The local broadcasting process may be performed by any means (wireless kiosk, local mobile phone broadcasting . . . ) however the preferred implementation is in mobile devices.

FIG. 1 shows an example embodiment. A web service 1 (a web page such as Facebook, Myspace, Sexy-Funky-Cool, Hot or not?, Sexy or not?, or a online game such as World Of Warcraft or Guildwars) provides 100 the Internet "achievement" to an achievements information server 2. The user uses the login and password for that specific web service 1. The important point here is that the achievement is not introduced by the user, the original web or game provides these achievements obtained from the activity of the user or the opinion of others users.

The achievements information server 2 stores the achievements received from the different Internet communities (the web services 1) and some information on the user's terminal/telephone, such as its position, and optionally the state of sensors incorporated in the terminal.

The broadcast user 4, who is going to broadcast his achievements, uses an application (e.g. Java midlet) in his mobile device 5 (e.g., mobile phone or PDA) that manages all the different achievements stored in the achievements information server 2. This mobile device 5 downloads 101 the achievement information in the mobile device 5 and arranges it by priority. The broadcast user 4 selects which of the achievements are going to be broadcasted and the priority. The connection to manage the information and preference is done using a cellular network (such as UMTS, GSM, LTE etc.) or WiFi.

The mobile device 5 can broadcast the achievements in two different ways, either using short range technology (such as Bluetooth or IEEE 802.15.4 Standard) to communicate 103 with other mobile devices 5' (belonging to receptors 6) or using the cellular connection or WiFi to send 104 the achievements along with its position and preferences (the current profile to be shown) to the achievements information server 2, configuring this way his current profile. On the other side, receptors (6,6') can access other user's achievements via short range technology, in the case of receptor 6, (e.g., those achievements broadcasted by broadcast users 4 via Bluetooth), but they can also retrieve (106,106') achievements from different users by accessing the achievements information server 2 and carrying out the appropriate search (this way the receptor (6,6') can also obtain information on the achievements of other users who are next to him).

The achievement information should contain the unique identity and the different achievements by priority order. Each achievement should contain two fields: the name of the web server 1 and the achievement text. For example:

| Unique Identity | Achievement1 (server, text) | Achievement2 (server, text) | ... |
|---|---|---|---|
| Frubio | "facebook", "330 friends" | "Call of Duty4", "prestige rank 6" | |

This information is broadcasted 103 regularly using the Bluetooth connections. Other users, receptor 6, using mobile devices 5' with the same midlet can capture all the different user information. The midlet will also filter the information, obtaining a view of the community achievements around him.

The entire communication can employ a certified mechanism in order to guarantee trusted information.

The achievement information from others users will be received also using the Bluetooth channel.

For the communication of the achievements a sensor network air interface ZigBee, glowpan or any variation of the IEEE 802.15.4 standard can also be used. The mobile device in this case would be another point in the sensor mesh and will broadcast and capture the achievements using this air interface. It can also be used any other short-range radio different from Bluetooth or 802.15.4, such as WiFi or Infrared.

Additionally, sensor information can be included in the communication, using the sensors in the mobile device or the sensors in the surroundings. The information would be captured using either bluetooth or 802.15.4 air interfaces.

In this case the broadcast should include measurements fields:

Unique Identity, achievement1 (server, text), achievement2 (server, text) . . . , measurement1 (text, value), measurement2 (text, value) . . . .

The application loaded in the mobile device 5 will filter all the broadcasted achievements. The filtering will have the following features:

- Merge same information in a single one. It could be possible that some devices in the area capture and retransmit the achievements received; for this reason the same user's achievements could be received by another user several times.
- The capability to filter for each unique identity the number of achievements to be taken into account. e.g. only capture two achievements. This is to avoid overload of information.
- The capability to filter certain achievement's servers, e.g. facebook, so the user only receives the information valuable for him.
- The capability to offer average representation of the captured achievements. E.g., 34 out of 100 achievements profile have Call of Duty4 web service, 50% classified as prestige rank 1, 25% prestige rank 2, 20% prestige rank 4 and 5% prestige rank 10.

This filtered information can also be sent 105 to the achievements information server 2, so the latter can update the position and current profile of the broadcast users 4. The filter should delete the information related to erroneous or fake unique identifiers.

The present invention can also be applied to business and public places (such as a pub, a library, a public square, etc.) where people could meet. There is a specific broadcasting device 8 installed in that area that captures all the achievements received from broadcast users 4 and broadcasts all of them. This broadcasting device 8 can additionally include in the broadcast information some measurements of the area taken from sensor devices 9, forming a wireless sensor network 11. All the information can be used to provide marketing information about the business (e.g., place with a % of hip-hop users (www-hiphop-net), level of noise (dB), smoke level (ug/m3N), etc.). This broadcasting device 8 can use DSL to be connected with the achievements information server 2. The broadcasting device 8 does not require internet achievements to broadcast as own achievements but it requires a unique identity in order to be filtered.

The consumers 10 are third parties that use the information provided by the achievements information server 2 to provide services, using the achievements information server API to manage the information.

Some examples about possible services provided by the consumers 10 could be (although they are not included in the scope of the present invention):

1—Provide connectivity to profiles of our interest.
2—Provide offers to certain profiles around the business. (e.g. mall center that provide discounts in pet shops only to the people with pikapet (www-pikapet-com) achievements.)
3—Provide areas of our interest. (e.g. provide information of a pub with a high number of Spanish facebook users in London.)
4—Receive time information in my specific position about sexy achievements percentage (www-funkysexycoolcom)
5—Provide a phone alarm when a threshold in achievements is reached in the area. E.g. % of World of Warcraft (an online game) achievements reaches 20.

The invention claimed is:

1. A method for sharing and recording achievements obtained from web services, the method comprising:
   receiving, at an achievements information server, from at least one web service, achievements realized by different Internet users through activity of the users in each web service;
   storing at the achievements information server said achievements associated with each Internet user;
   for each Internet user:
      downloading the stored achievements of the Internet user to a mobile device of a corresponding broadcast user;
      the broadcast user configuring a current profile indicating which of the achievements to broadcast and a priority of the achievements to broadcast;
      filtering the downloaded achievements to select at least one achievement to broadcast; and
      broadcasting, by the mobile device of the broadcast user, said at least one selected achievement;
   determining which of the broadcast users are located at a specific area;
   determining an average profile corresponding to the specific area based on the achievements of the broadcast users located at the specific area; and
   broadcasting the average profile of the specific area.

2. The method for sharing and recording achievements obtained from web services according to claim 1, wherein the broadcasting of the at least one selected achievement is performed in at least one of the following ways:
   using short range technology to communicate with other electronic devices;
   using a cellular network or a WiFi connection to communicate with the achievements information server.

3. The method for sharing and recording achievements obtained from web services according to claim 1, further comprising:
   receiving at the achievements information server the at least one broadcasted achievement corresponding to different broadcast users, along with their corresponding localization; and sending from the achievements information server, as a response to a request, information related to the localization of broadcast users with at least one achievement fulfilling determined conditions established on the request.

4. The method for sharing and recording achievements obtained from web services according to claim 1, wherein determining which of the broadcast users are located at the specific area comprises capturing, at a broadcasting device installed at the specific area, achievements received from the broadcast users located at the specific area.

5. The method for sharing and recording achievements obtained from web services according to claim 4, further comprising:
broadcasting, by the broadcasting device, together with the achievements captured by the broadcasting device, measurement data from at least one sensor device installed at the specific area.

6. The method for sharing and recording achievements obtained from web services according to claim 4, wherein the broadcasting of said achievements captured by the broadcasting device is performed in at least one of the following ways:
using short range technology to communicate with other electronic devices; and
using a cellular network or a DSL connection to communicate with the achievements information server.

7. The method for recited in claim 4, further comprising broadcasting, by the broadcasting device, said achievements captured.

8. The method for sharing and recording achievements obtained from web services according to claim 1, wherein each downloaded achievement comprises:
an identity of the subject of the downloaded achievement,
information specifying the web service that produced the achievement, and
information about the achievement.

9. The method according to claim 1, wherein the at least one web service comprises an online game site and the achievements of each user comprise achievements of the user obtained through activity of the user at the online game site.

10. The method according to claim 1, wherein the at least one web service comprises a social web site and the achievements of each user comprise opinions of the user by other users of the social web site.

11. The method recited in claim 1, wherein the mobile device comprises a mobile telephone.

12. The method recited in claim 1, wherein broadcasting the average profile of the specific area is performed by a broadcasting device installed at the specific area.

13. The method according to claim 12, further comprising broadcasting, by the broadcasting device, data based on the average profile.

14. The method according to claim 13, wherein the data comprises information and services based on the profile.

15. The method according to claim 13, wherein the broadcasting device is installed at a business and the method further comprises determining marketing information about the business based on the profile.

16. A system for sharing and recording achievements obtained from web services, the system comprising:
an achievements information server, comprising:
means for receiving, from at least one web service, achievements realized by different Internet users through activity of the users in each web service; and
means for storing said achievements associated with each Internet user; and
a mobile device corresponding to each Internet user, each mobile device being configured to:
download, from the achievements information server, the achievements of the corresponding Internet user;
configure a current profile indicating which of the achievements to broadcast and a priority of the achievements to broadcast;
filter the downloaded achievements to select at least one achievement, from among the downloaded achievements, to broadcast; and
broadcast said at least one selected achievement,
wherein the system is configured to:
determine which of the Internet users are located at a specific area;
determine an average profile corresponding to the specific area based on the achievements of the Internet users located at the specific area; and
broadcast the average profile of the specific area.

17. The system for sharing and recording achievements obtained from web services according to claim 16, wherein each mobile device is configured to broadcast the at least one selected achievement in at least one of the following ways:
using short range technology to communicate with other electronic devices; and
using a cellular network or a WiFi connection to communicate with the achievements information server.

18. The system for sharing and recording achievements obtained from web services according to claim 16, wherein the achievements information server is configured to:
receive the at least one broadcasted achievement corresponding to the Internet users, along with their corresponding localization; and
send, as a response to a request, information related to the localization of the Internet users with at least one achievement fulfilling determined conditions established on the request.

19. The system for sharing and recording achievements obtained from web services according to claim 16, wherein each downloaded achievement comprises:
an identity of the subject of the downloaded achievement,
information specifying the web service that produced the achievement, and
information about the achievement.

20. The system recited in claim 16, further comprising a broadcasting device, the broadcasting device being configured to determine which of the Internet users are located at the specific area and broadcast the average profile of the specific area.

21. The system for sharing and recording achievements obtained from web services according to 20, wherein the broadcasting device is configured to capture and broadcast achievements received from the Internet users located at the specific area.

22. The system for sharing and recording achievements obtained from web services according to claim 21, wherein the broadcasting device is further configured to broadcast, together with the achievements captured by the broadcasting device, measurement data from at least one sensor device installed at the specific area.

23. The system for sharing and recording achievements obtained from web services according to claim 21, wherein the broadcasting device is configured to broadcast said achievements captured by the broadcasting device in at least one of the following ways:
using short range technology to communicate with other electronic devices; and
using a cellular network or a DSL connection to communicate with the achievements information server.

* * * * *